(12) United States Patent
Ikuta et al.

(10) Patent No.: US 7,242,120 B2
(45) Date of Patent: Jul. 10, 2007

(54) ALTERNATOR

(75) Inventors: Hiroya Ikuta, Tokyo (JP); Toshiaki Kashihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 31 days.

(21) Appl. No.: 11/188,794

(22) Filed: Jul. 26, 2005

(65) Prior Publication Data

US 2006/0208581 A1    Sep. 21, 2006

(30) Foreign Application Priority Data

Mar. 17, 2005    (JP) ............... 2005-077362

(51) Int. Cl.
 *H02K 9/04* (2006.01)
 *H02K 9/06* (2006.01)
 *H02K 11/04* (2006.01)
(52) U.S. Cl. .......................... 310/62; 310/64
(58) Field of Classification Search ................. 310/58, 310/60 R, 62, 60 A, 64, 68 D
See application file for complete search history.

(56) References Cited

U.S. PATENT DOCUMENTS 4,418,295 A  *  11/1983  Shiga ........................... 310/59

5,729,063 A  *  3/1998  Adachi et al. ............. 310/68 D
6,198,187 B1 *  3/2001  Asao et al. ................ 310/68 D

FOREIGN PATENT DOCUMENTS

| DE | 3514207 A1 * | 10/1986 | ............. 310/62 |
| JP | 59204446 A * | 5/1983 | ............. 310/63 |
| JP | 2001-45726 A | 2/2001 | |

\* cited by examiner

*Primary Examiner*—Tran Nguyen
(74) *Attorney, Agent, or Firm*—Sughrue Mion, PLLC (57) ABSTRACT

An automotive alternator according to the present invention includes: a shaft having an end portion rotatably supported by a rear bearing housed inside a rear bearing housing portion of a rear bracket; a rectifier for converting an alternating current into a direct current; and a first centrifugal fan for cooling a rotor, a stator, and the rectifier by sucking in external air through a suction inlet in the bracket when the rotor rotates, the rectifier has a positive-side heat sink for cooling a plurality of positive-side diodes, the suction inlet is formed in a vicinity of the rear bearing housing portion, and a plurality of rear bearing cooling fins extending in a direction perpendicular to the shaft are formed on a side of the suction inlet near the rear bearing housing portion.

14 Claims, 9 Drawing Sheets

ALTERNATOR

BACKGROUND OF THE INVENTION

1. Field of the Invention

The present invention relates to an alternator in which a rotor, a stator, and a rectifier are cooled by external air sucked in through a suction inlet of a rear bracket by rotation of a fan fixed to the rotor.

2. Description of the Related Art

Conventionally, alternators are known that include: a case constituted by a rear bracket and a front bracket; a shaft having a first end portion disposed in a rear bearing housing portion of the rear bracket and a second end portion rotatably supported in a front bearing disposed in a front bearing housing portion of the front bracket; a rotor fixed to the shaft; a stator constituted by: a stator core fixed to an inner wall surface of the case; and a stator coil configured by winding conducting wire onto the stator core; a rectifier disposed inside the rear bracket and electrically connected to the stator coil so as to convert alternating current generated in the stator coil into a direct current; and fans fixed to the rotor, the fans cooling the rectifier by sucking in external air through suction inlets in the rear bracket when the rotor rotates, wherein the rectifier has: a heat sink having heat sink fins standing on a rear surface; and a plurality of diodes fixed to a front surface of the heat sink; and a plurality of rear bearing housing portion fins formed on outer peripheral portions of the rear bearing housing portion face the heat sink fins. (See Patent Literature 1, for example.)

In the case of such automotive alternators, as output increases, the amount of heat generated by the diodes and the stator increases, thereby increasing the temperature of the diodes and the temperature of the stator and also increasing the temperature of the rear bracket housing them, and as a result the temperature of the rear bearing housing portion increases.

In high output automotive alternators, at an ambient temperature of 100 degrees Celsius, for example, the temperature of the stator reaches approximately 230 degrees Celsius, the temperature of the diodes approximately 190 degrees Celsius, the temperature of the rear bearing approximately 170 degrees Celsius, and the temperature of the front bearing approximately 160 degrees Celsius.

The reason that the temperature of the rear bearing is higher than that of the front bearing is that the rear bracket receives heat generated in negative-side diodes because the heat sink of the negative-side diodes is in direct contact with the rear bracket.

Patent Literature 1

Japanese Patent Laid-Open No. 2001-45726 (Gazette: FIG. 5)

In such automotive alternators, although the rear bearing housing portion fins are disposed on an outer peripheral portion of the rear bearing housing portion in order to reduce the temperature of the rear bearing, because air passing through the rear bearing housing portion fins has already passed through rear bracket fins mainly cooling the negative-side diodes and positive-side heat sink fins cooling positive-side diodes and been warmed, at an ambient temperature of 100 degrees Celsius, the air is at approximately 140 degrees Celsius when it passes through the rear bearing housing portion fins.

There is a heat tolerance threshold for each of the members, such as 240 degrees Celsius for the stator, 200 degrees Celsius for the diodes, 170 degrees Celsius for the bearings, for example, and there is a risk that the temperature of the rear bearing alone may exceed the heat tolerance threshold.

If such an event occurs, grease in the rear bearing may undergo a heat change, whereby the grease may no longer fulfill its role as a lubricant, the rear bearing may make rattling noises during rotation of the rotor, and although a bearing having an endurance specification of 180 degrees Celsius, for example, can be used in order to prevent that, one problem has been that such measures lead to cost increases.

Automotive alternator output is generally proportional to electric current in the rotor coil wound onto the rotor, and the electric current in the rotor coil is determined by the temperature of the rotor coil. That is to say, a constant voltage is applied between first and second end portions of the rotor coil, and the higher the temperature of the rotor coil, the smaller the electric current in the rotor coil because electrical resistance in the rotor coil increases.

In other words, in order to improve automotive alternator output, it is necessary to increase the electric current value flowing through the rotor coil, and for that purpose it is necessary to reduce the temperature of the rotor coil. The temperature of the rotor coil depends on heat generated in the rotor coil itself, and also on heat received from the case through the rear bearing and the front bearing.

Thus, in order to cool the rotor coil, methods that increase a rate of cooling airflow passing through the rotor coil are also conceivable, but increasing the cooling airflow rate leads directly to an increase in wind noise.

SUMMARY OF THE INVENTION

The present invention aims to solve the above problems and an object of the present invention is to provide an alternator enabling increased output to be achieved by suppressing temperature increases in a rear bearing without relying on increases in cooling airflow rate.

In order to achieve the above object, according to one aspect of the present invention, there is provided an alternator including: a case constituted by a rear bracket and a front bracket; a shaft having an end portion rotatably supported by a rear bearing disposed inside a rear bearing housing portion of the rear bracket; a rotor fixed to the shaft; a stator constituted by: a stator core fixed to an inner wall surface of the case; and a stator coil configured by winding conducting wire onto the stator core; a rectifier disposed inside the rear bracket and electrically connected to the stator coil so as to convert alternating current generated in the stator coil into a direct current; and a fan fixed to the rotor, the fan cooling the rotor, the stator, and the rectifier by sucking in external air through a suction inlet in the rear bracket when the rotor rotates, the rectifier having a heat sink for cooling a plurality of diodes, wherein: the suction inlet is formed in a vicinity of the rear bearing housing portion; and a plurality of rear bearing cooling fins extending in a direction perpendicular to the shaft are formed on a side of the suction inlet near the rear bearing housing portion.

Using an alternator according to the present invention, temperature increases in the rear bearing can be suppressed, enabling increases in output.

DETAILED DESCRIPTION OF THE PREFERRED EMBODIMENTS

Preferred embodiments of the present invention will now be explained with reference to the drawings.

Embodiment 1

Figure 1:
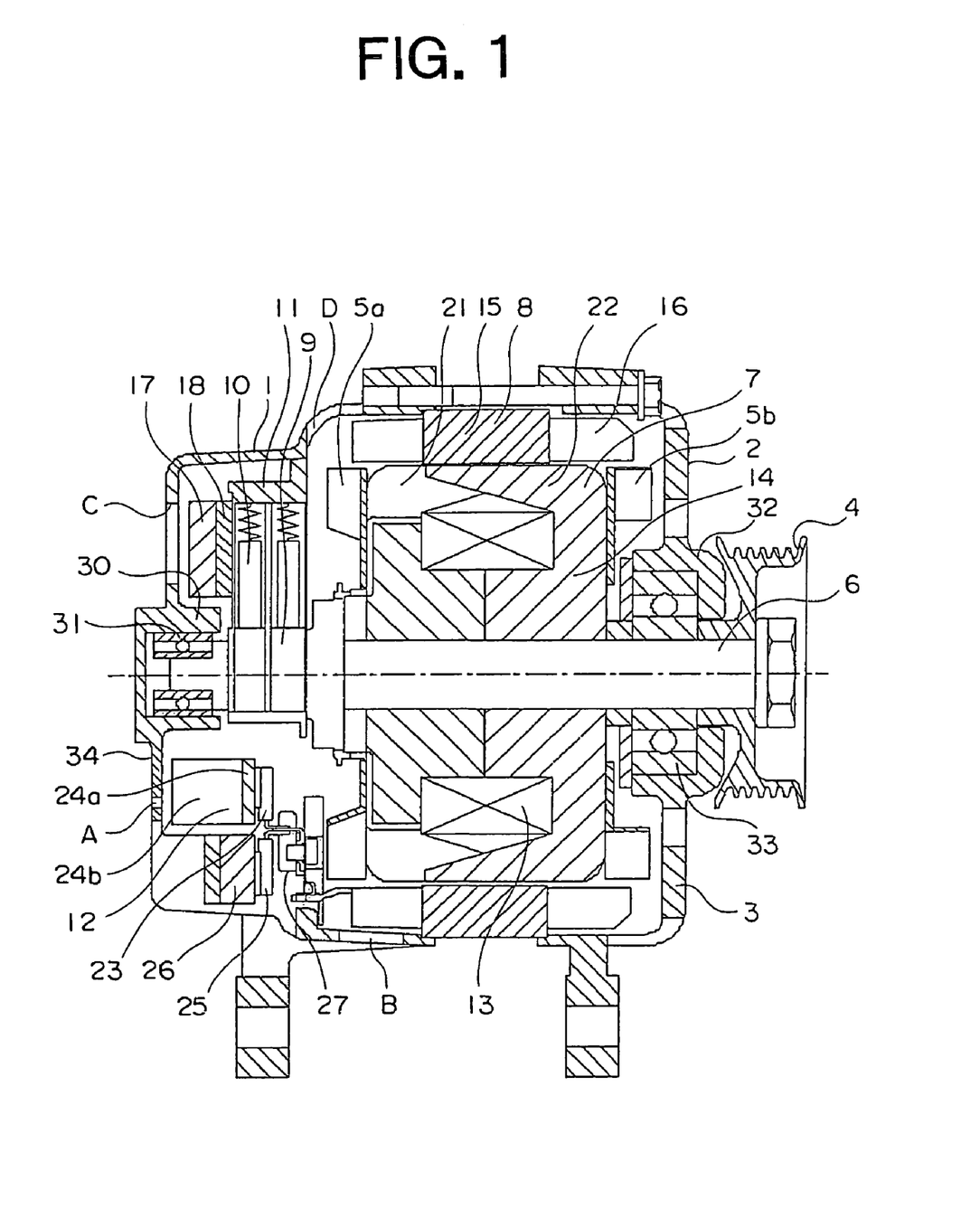
FIG. 1 is a cross section showing an automotive alternator according to Embodiment 1 of the present invention.
Figure 2:
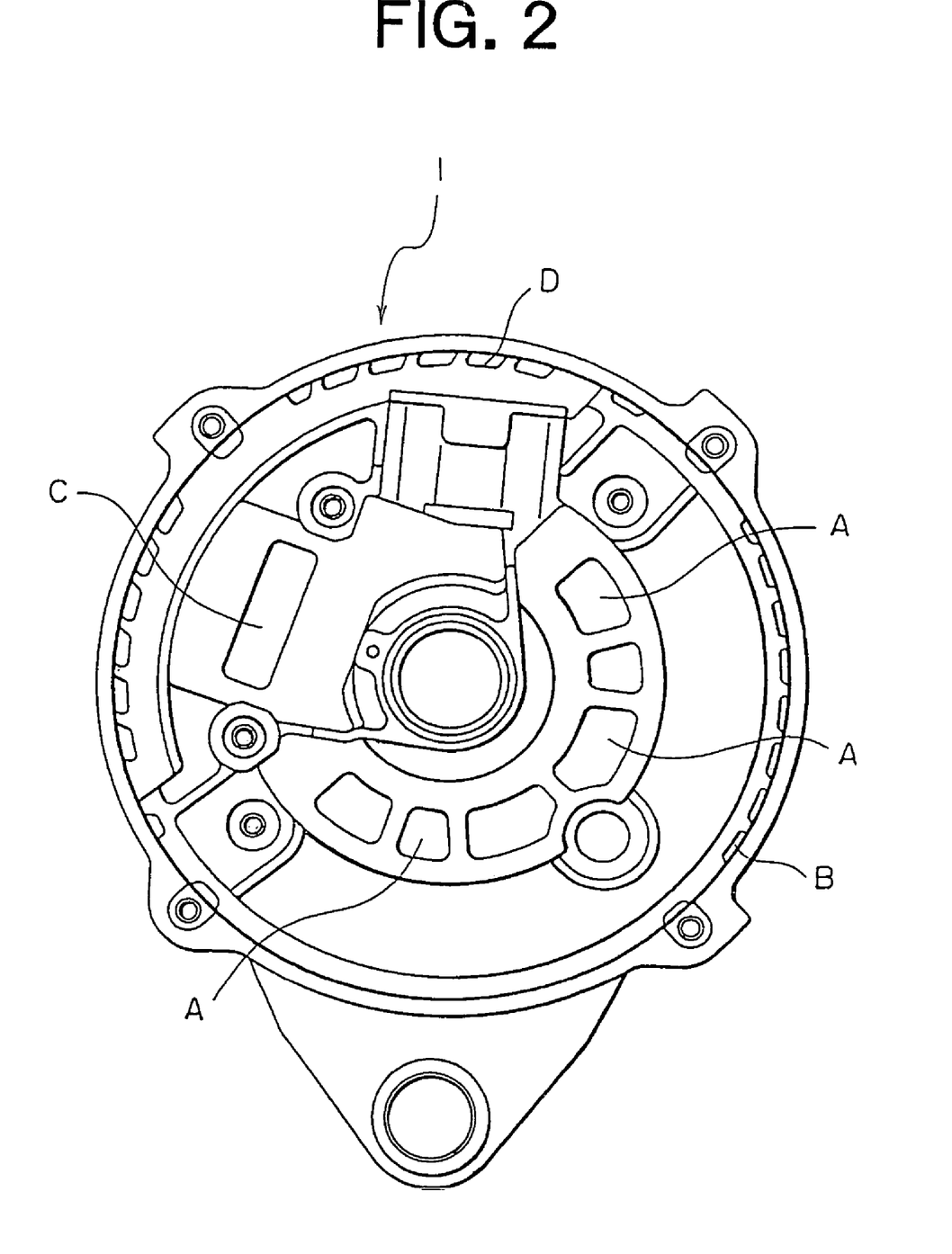
FIG. 2 is a diagram showing a rear bracket from FIG. 1 when viewed from inside.
Figure 3:
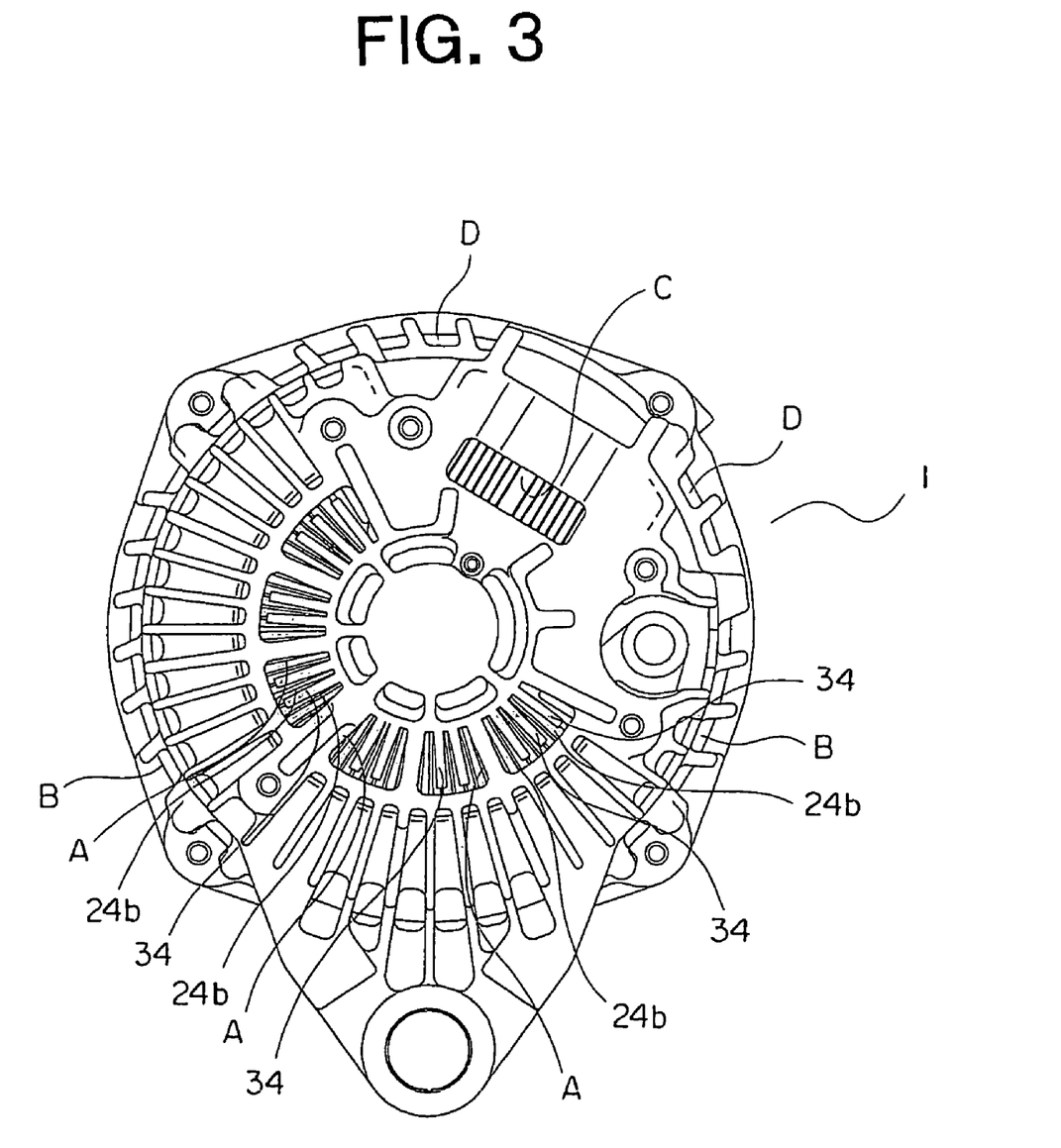
FIG. 3 is a diagram showing the automotive alternator from FIG. 1 when viewed from a rear bracket end.
Figure 4:
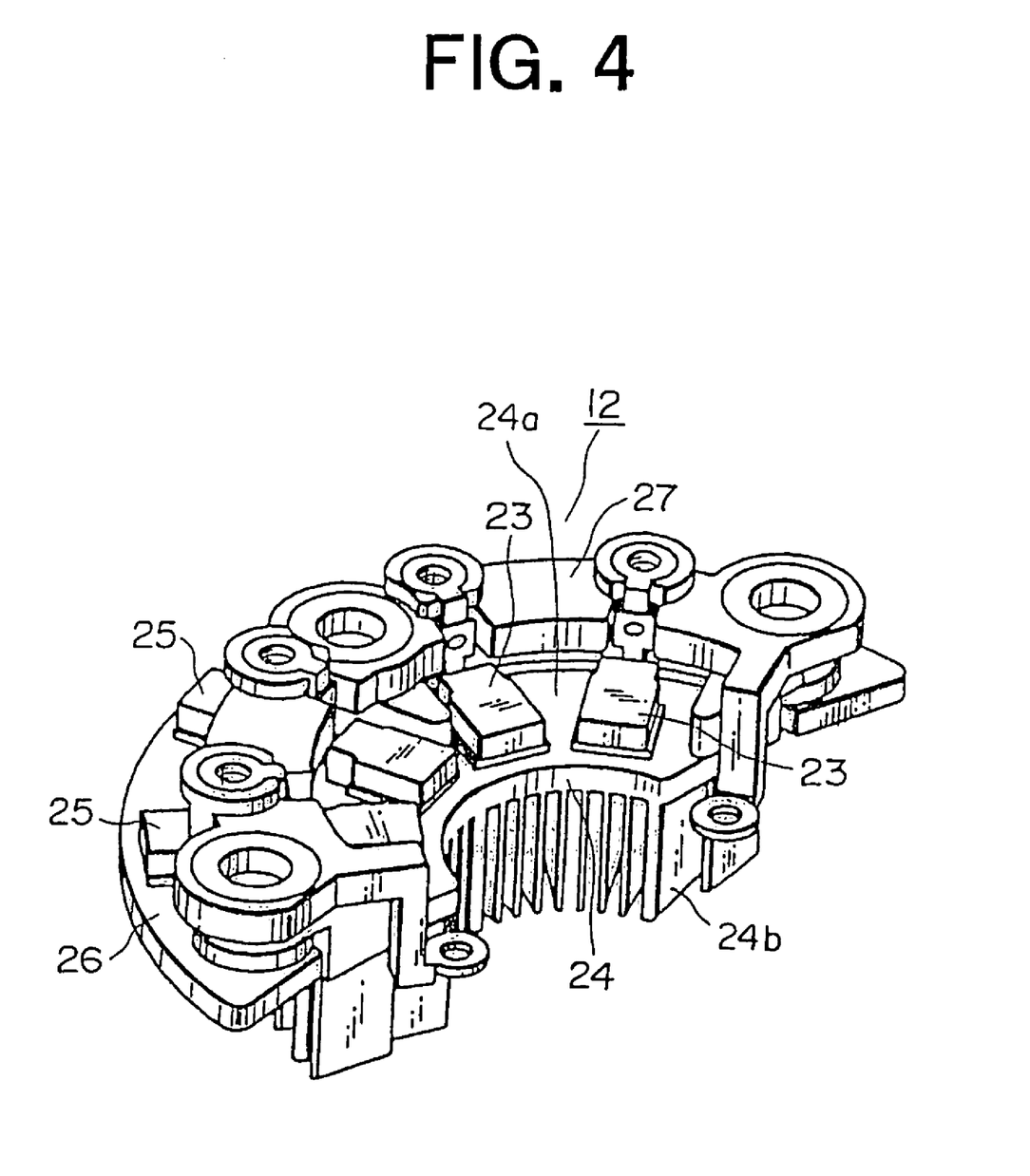
FIG. 4 is an overall perspective showing a rectifier from FIG. 1.

FIG. 1 is a cross section of an automotive alternator according to the present invention, FIG. 2 is a diagram showing a rear bracket 1 from FIG. 1 when viewed from inside, FIG. 3 is a diagram showing the automotive alternator from FIG. 1 when viewed from a rear bracket end, and FIG. 4 is an overall perspective showing a rectifier 12 from FIG. 1.

In this automotive alternator, a case 3 is constituted by a rear bracket 1 and a front bracket 2 made of aluminum. A rear bearing 31 is fitted into a rear bearing housing portion 30 of the rear bracket 1. A front bearing 33 is fitted into a front bearing housing portion 32 of the front bracket 2. The front bearing 33 and the rear bearing 31 rotatably support a shaft 6 having a pulley 4 fixed to a first end portion. A Lundell-type rotor 7 is fixed to an intermediate portion of the shaft 6. Slip rings 9 for supplying an electric current to the rotor 7 are fixed to a second end portion of the shaft 6.

A stator 8 is fixed to an inner wall surface inside the case 3. Tip end surfaces of a pair of brushes 10 housed inside a brush holder 11 slide in contact with the slip rings 9. A rectifier 12 electrically connected to the stator 8 so as to convert an alternating current generated in the stator 8 into a direct current is disposed in an interior portion of the rear bracket 1. A regulator heat sink 17 is fitted onto the brush holder 11. A regulator 18 for adjusting an alternating voltage generated in the stator 8 is affixed to the regulator heat sink 17 using an adhesive.

The rotor 7 includes: a rotor coil 13 for generating magnetic flux on passage of an electric current; and a pole core 14 disposed so as to cover the rotor coil 13, magnetic poles being formed in the pole core 14 by the magnetic flux from the rotor coil 13. The pole core 14 is constituted by a first pole core body 21 and a second pole core body 22 that alternately intermesh with each other. A first centrifugal fan 5a and a second centrifugal fan 5b for cooling are welded to axial end surfaces of the first pole core body 21 and the second pole core body 22, respectively.

The stator 8 includes: a stator core 15; and a stator coil 16 in which conducting wires are wound onto the stator core 15 such that an alternating current arises due to changes in the magnetic flux from the rotor coil 13 accompanying rotation of the rotor 7.

The rectifier 12 includes: a positive-side heat sink 24 constituted by an arc-shaped heat sink main body 24a and a plurality of diode cooling fins 24b disposed upright on a rear surface of the heat sink main body 24a (near the rear bracket 1); four positive-side diodes 23 fixed by soldering to a front surface of the heat sink main body 24a and molded in a resin; an arc-shaped negative-side heat sink 26 fixed to the rear bracket 1 and grounded; four negative-side diodes 25 fixed by soldering to the negative-side heat sink 26 and molded in a resin; and a circuit board 27 for connecting each of the diodes 23 and 25 and the stator coil 16 electrically.

The positive-side heat sink 24 and the negative-side heat sink 26 are housed inside the case 3 so as to be disposed in a generally planar shape in a radial direction of the shaft 6. The positive-side heat sink 24 and the negative-side heat sink 26 are made of aluminum having a high coefficient of thermal conductivity.

Suction inlets A are formed at six positions on the rear bracket 1 so as to be spaced from each other facing the positive-side heat sink 24. Rear bearing cooling fins 34 are formed at a uniform pitch on peripheral edge portions of the suction inlets A near the rear bearing housing portion 30. The rear bearing cooling fins 34 face the diode cooling fins 24b of the positive-side heat sink 24.

Figure 6:
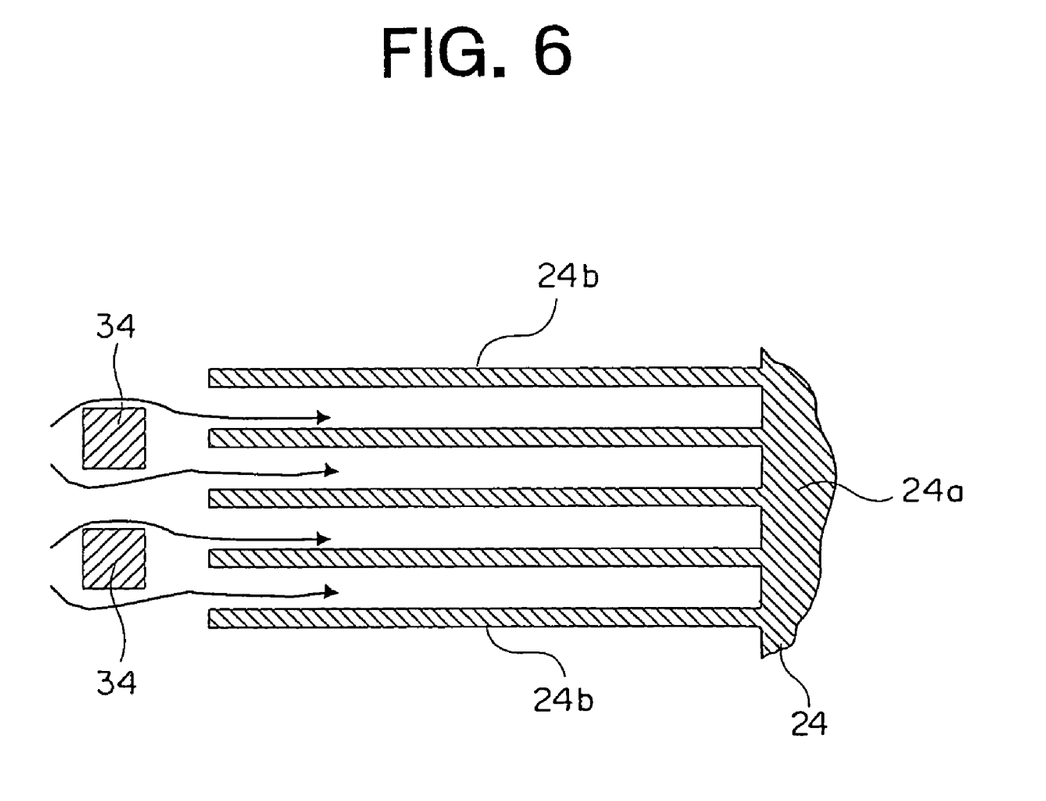
FIG. 6 is a cross section taken along line VI-VI in FIG. 5 viewed in the direction of the arrows.

The rear bearing cooling fins 34, which extend in a direction perpendicular to the shaft 6, formed so as to overlap with every second diode cooling fin 24b when the rear bracket 1 is viewed in an axial direction of the shaft 6, as shown in FIG. 6.

Moreover, suction inlets C are formed on the rear bracket 1 facing the regulator heat sink 17. Air outlets B and D for externally discharging the air that has entered through the suction inlets A and C are also formed on the rear bracket 1.

In an automotive alternator having the above configuration, since an electric current is supplied from a battery (not shown) through the brushes 10 and the slip rings 9 to the rotor coil 13, generating a magnetic flux, and at the same time, the pulley 4 is driven by an engine, rotating the rotor 7 by means of the shaft 6, a rotating magnetic field is applied to the stator coil 16, giving rise to an electromotive force in the stator coil 16. This alternating-current electromotive force passes through the positive-side diodes 23 and the negative-side diodes 25 of the rectifier 12 so as to be converted into a direct current, the magnitude thereof is also adjusted by the regulator 18, and the battery is charged.

Figure 5:
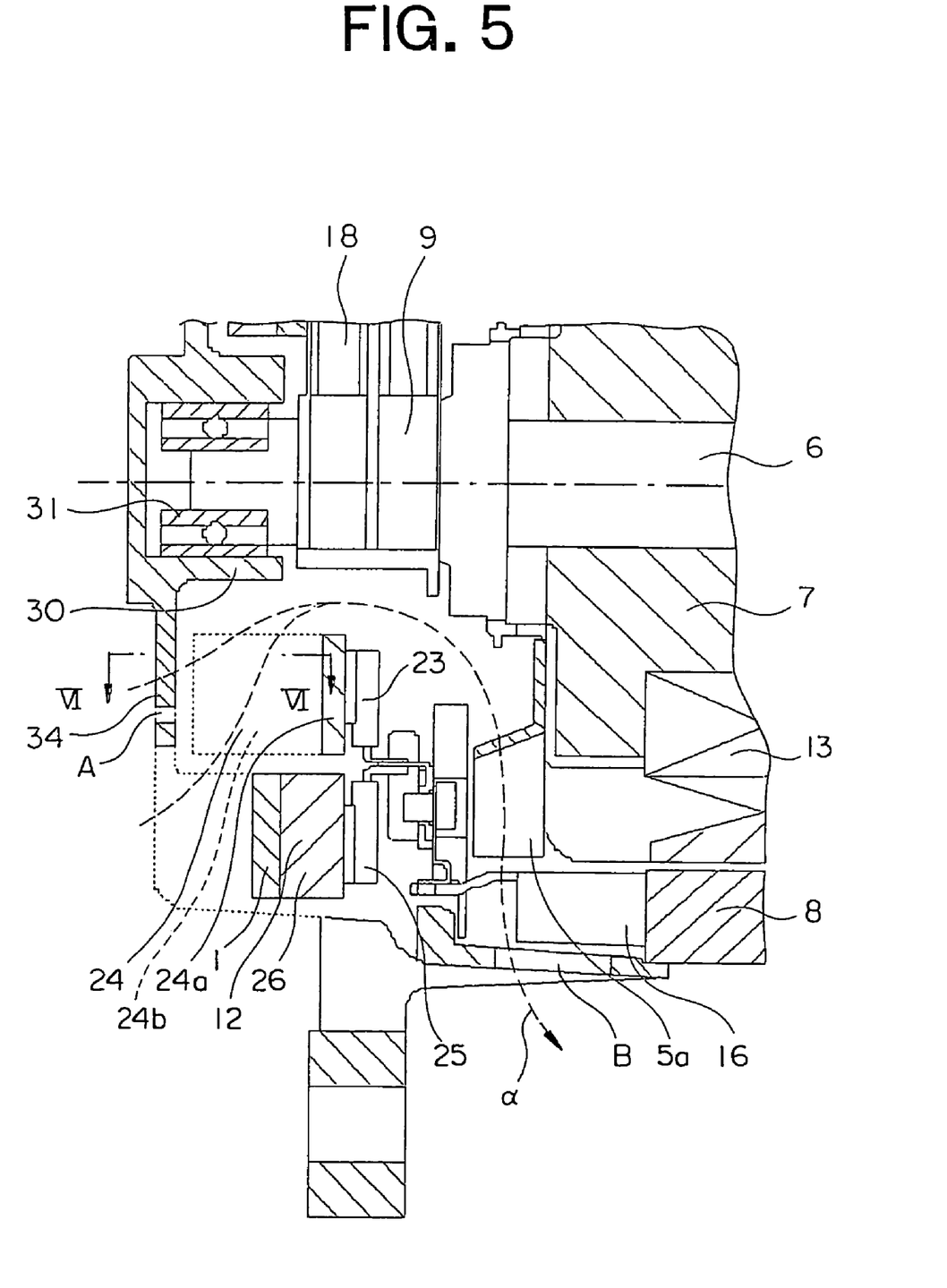
FIG. 5 is a partial enlargement of the automotive alternator in FIG. 1.

Now, the centrifugal fans 5a and 5b rotate together with the rotation of the rotor 7, and due to this rotation external air flows through the suction inlets A of the rear bracket 1 as indicated by arrow a in FIG. 5, cooling the positive-side heat sink 24 and the positive-side diodes 23. That external air then flows radially outward due to the first centrifugal fan 5a, cools end portions of the stator coil 16 at the rear end, and is discharged externally through the air outlets B.

Because the rear bearing cooling fins 34 are disposed on the suction inlets A and a portion of the external air strikes the rear bearing cooling fins 34 directly, the rear bearing cooling fins 34 are cooled and the rear bearing housing portion 30, which is integrated with the rear bearing cooling fins 34, is also cooled by thermal conduction, cooling the rear bearing 31 housed in the rear bearing housing portion 30.

Because the rear bearing housing portion 30 is disposed in the vicinity of the suction inlets A, a portion of the external air also strikes the rear bearing housing portion 30 directly, cooling the rear bearing 31 housed in the rear bearing housing portion 30.

The present inventors performed experiments in order to ascertain the cooling effect on the rear bearing 31 due to the presence or absence of the rear bearing cooling fins 34.

As a result, it was found that the temperature of the rear bearing 31 is reduced by approximately 15 degrees Celsius in an ambient temperature of 100 degrees Celsius, and in addition that output is improved by three percent by reducing the temperature of the rear bearing 31.

Since the surface area of the suction inlets A is reduced by disposing the rear bearing cooling fins 34 and air resistance at the suction inlets A is increased, the temperature of the positive-side diodes 23 increased by approximately three degrees Celsius, but this was not problem at all since there is a safety margin in the temperature of the positive-side diodes 23 relative to the heat tolerance threshold.

Moreover, in a low-output automotive alternator, there are cases in which the temperature of the positive-side diodes 23 will be less than or equal to the heat tolerance threshold even if the diode cooling fins 24b are not disposed on the positive-side heat sink 24 and in such cases the diode cooling fins 24b naturally may also be eliminated.

Figure 7:
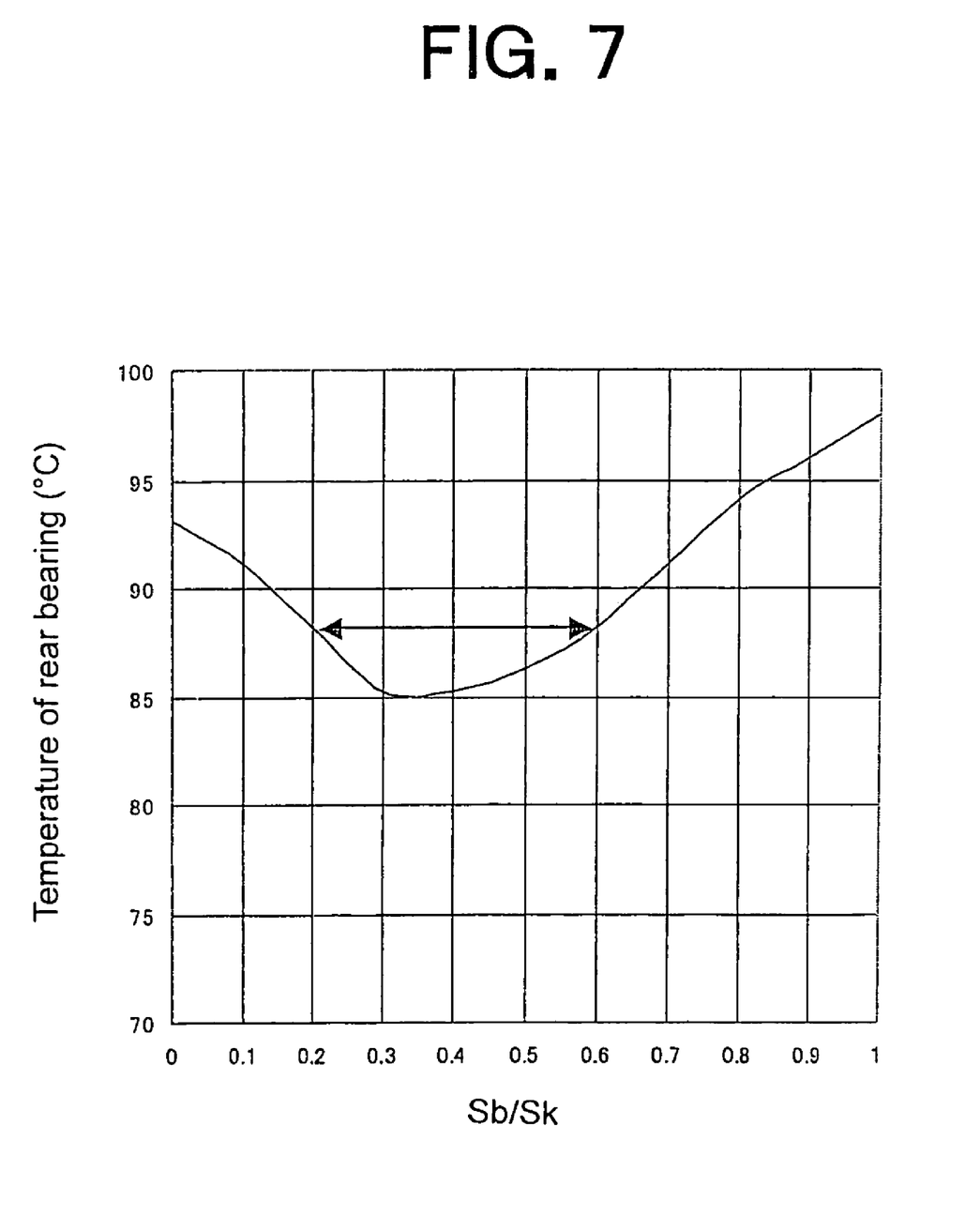
FIG. 7 is a graph showing a relationship between (Sb/Sk) and temperature of a rear bearing.

The present inventors also found by experiment a relationship between (Sb/Sk) and the temperature of the rear bearing 31, where Sb is a total surface area occupied by the rear bearing cooling fins 34 in a plane of the suction inlets A and Sk is an overall surface area of the suction inlets A without the rear bearing cooling fins 34.

The results are shown in FIG. 7. From FIG. 7, it was found that if the value of Sb is too large, in other words, if the ratio occupied by the rear bearing cooling fins 34 in the suction inlets A is too large, the airflow passing through the suction inlets A decreases, thereby reducing cooling efficiency of the rear bearing 31, but on the other hand, if the value of Sb is too small the cooling effect of the rear bearing cooling fins 34 on the rear bearing 31 decreases since the surface area of the rear bearing cooling fins 34 is reduced even though the airflow passing through the suction inlets A is increased.

Thus, it was found that the cooling efficiency of the rear bearing 31 is high when the value of (Sb/Sk) is within a range from 0.2 through 0.6.

As explained above, using an automotive alternator according to Embodiment 1, because a plurality of straight rear bearing cooling fins 34 extending in a direction perpendicular to the shaft 6 are formed in the suction inlets A in the vicinity of the rear bearing housing portion 30, contact surface area coming into contact with external air at edge portions of the suction inlets A increases and cooling performance of the rear bearing 31 is improved, suppressing temperature increases in the rotor coil 13, and as a result the electric current value flowing through the rotor coil 13 can be increased, enabling increases in output.

Because a plurality of diode cooling fins 24b extending in an axial direction of the shaft 6 are formed on the positive-side heat sink 24 so as to face the rear bearing cooling fins 34, the cooling performance of the positive-side diodes 23 is improved.

Because each of the rear bearing cooling fins 34 is disposed so as to overlap with a diode cooling fin 24b when the rear bracket 1 is viewed in an axial direction of the shaft 6, as shown in FIG. 6, external air flows over two side surfaces of each of the rear bearing cooling fins 34 and is led between the diode cooling fins 24b smoothly, improving the cooling performance of the positive-side diodes 23.

Moreover, in this embodiment, the rear bearing cooling fins 34 are disposed so as to overlap with every second diode cooling fin 24b, but the rear bearing cooling fins 34 may also be disposed so as to overlap with each of the diode cooling fins 24b, or for example, may also be disposed so as to overlap with every third diode cooling fin 24b.

Embodiment 2

Figure 8:
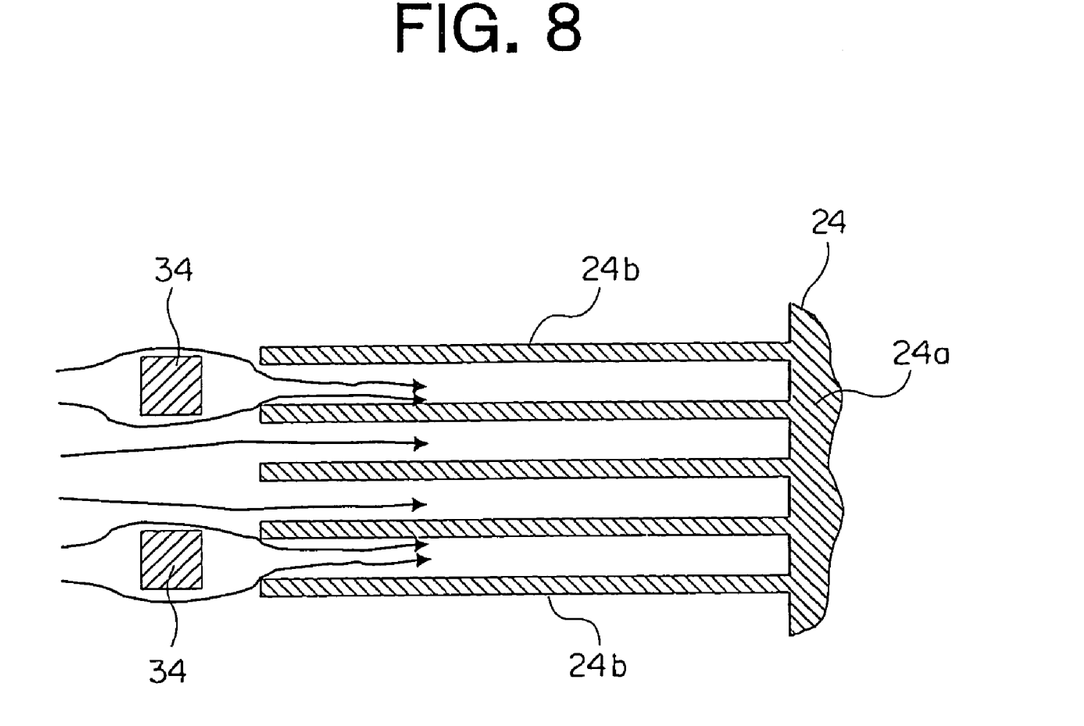
FIG. 8 is a partial cross section of an automotive alternator according to Embodiment 2 of the present invention.

FIG. 8 is a partial cross section of an automotive alternator according to Embodiment 2 of the present invention.

This embodiment is similar to the automotive alternator according to Embodiment 1 except for the fact that each of the rear bearing cooling fins 34 is disposed between an adjacent pair of diode cooling fins 24b when the rear bracket 1 is viewed in an axial direction of the shaft 6.

In this embodiment, because external air turns inward at a downstream end of each of the rear bearing cooling fins 34 and is led between the diode cooling fins 24b, the cooling performance of the rear bearing cooling fins 34, in other words, the cooling performance of the rear bearing 31, is improved compared to that of Embodiment 1.

Embodiment 3

Figure 9:
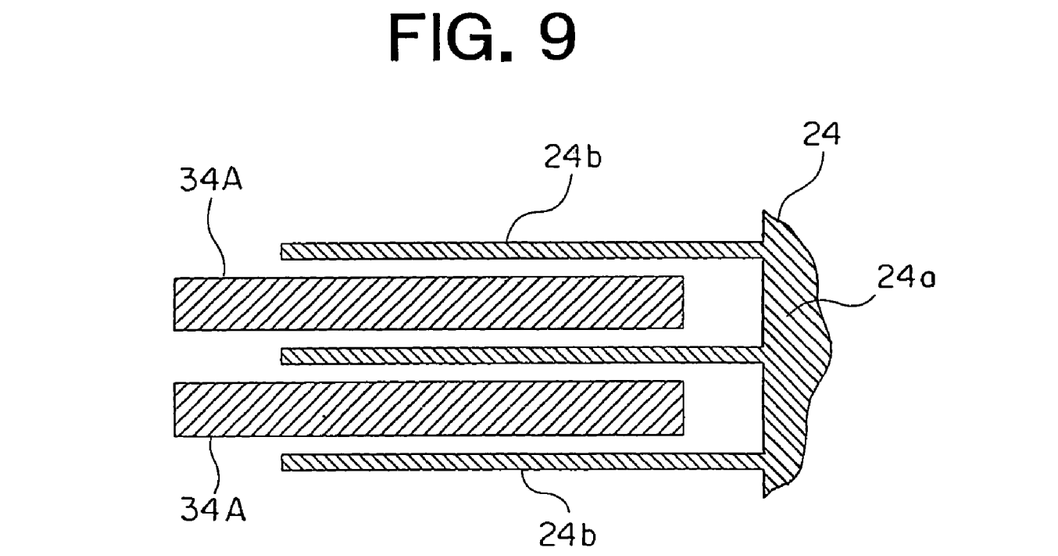
FIG. 9 is a partial cross section of an automotive alternator according to Embodiment 3 of the present invention.

FIG. 9 is a partial cross section of an automotive alternator according to Embodiment 3 of the present invention.

This embodiment is similar to the automotive alternator according to Embodiment 2 except for the fact that rear bearing cooling fins 34A are disposed so as to extend in an axial direction of the shaft 6 between adjacent pairs of diode cooling fins 24b.

In this embodiment, although the airflow led between the pairs of diode cooling fins 24b is significantly reduced, which lowers the cooling performance of the positive-side heat sink 24, the surface area of the rear bearing cooling fins 34A is increased and the cooling performance of the rear bearing 31 is improved significantly, enabling the temperature of the rear bearing 31 to be significantly reduced.

Embodiment 4

Figure 10:
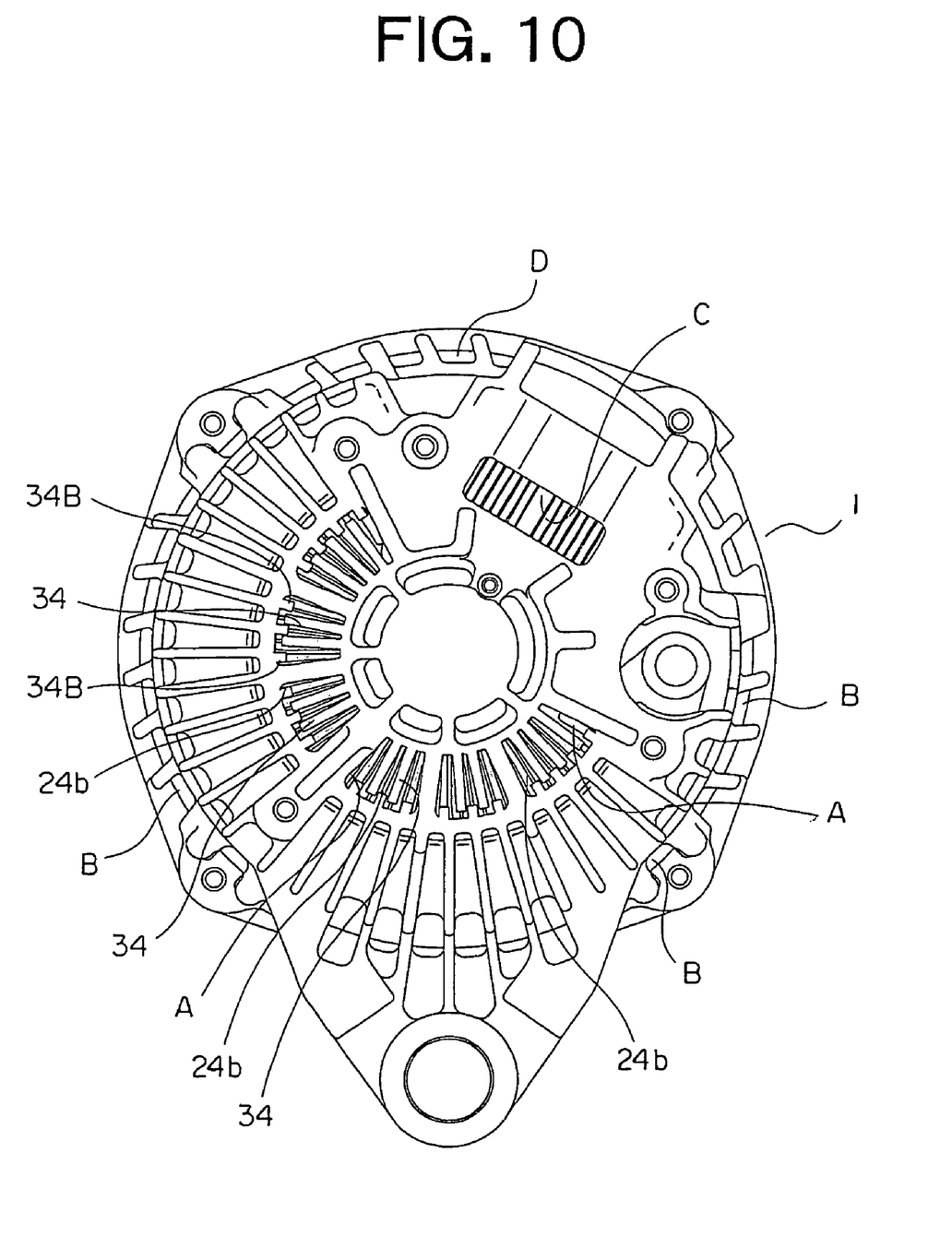
FIG. 10 is a diagram showing an automotive alternator according to Embodiment 4 of the present invention when viewed from a rear bracket end.

FIG. 10 is a diagram showing an automotive alternator according to Embodiment 4 of the present invention when viewed from a rear bracket end.

This embodiment is similar to the automotive alternator according to Embodiment 1 except for the fact that rear bearing cooling fins 34B are also additionally disposed on an opposite side of the suction inlets A from the rear bearing housing portion 30 in a rear bracket 1 such as that shown in Embodiment 1.

In this configuration, heat dissipation characteristics of an external region of the suction inlets A of the rear bracket 1 are also improved compared to that of Embodiment 1 by disposing the rear bearing cooling fins 34B.

Moreover, in each of the above embodiments, explanations were given for automotive alternators, but of course the present invention can also be applied to alternators other than those used in automotive vehicles. Furthermore, the present invention can also be applied to alternators in which negative-side diodes are disposed radially inside and positive-side diodes are disposed radially outside.

What is claimed is:

1. An alternator comprising:
a case including a rear bracket and a front bracket;
a shaft having an end portion rotatably supported by a rear bearing disposed inside a rear bearing housing portion of said rear bracket;
a rotor fixed to said shaft;
a stator comprising, a stator core fixed to an inner wall surface of said case; and a stator coil configured by winding conducting wire onto said stator core;

a rectifier disposed inside said rear bracket and electrically connected to said stator coil so as to convert alternating current generated in said stator coil into a direct current; and a fan fixed to said rotor, said fan cooling said rotor, said stator, and said rectifier by sucking in external air through a suction inlet in said rear bracket when said rotor rotates, said rectifier having a heat sink with a plurality of diode cooling fins for cooling a plurality of diodes, wherein:

said suction inlet is formed in a vicinity of said rear bearing housing portion, so as to overlap with at least a portion of said plurality of diode cooling fins in an axial direction of said shaft; and a plurality of rear bearing cooling fins extending in a direction perpendicular to said shaft are formed to extend from an inner peripheral side of said suction inlet near said rear bearing housing portion.

2. The alternator according to claim 1, wherein:

said plurality of diode cooling fins extend in said axial direction of said shaft and are formed on said heat sink facing said rear bearing cooling fins.

3. The alternator according to claim 1, wherein:

said rear bearing cooling fins are also additionally formed so as to extend in a direction opposite to said direction perpendicular to said shaft on an opposite side of said suction inlet from said rear bearing housing portion.

4. The alternator according to claim 2, wherein:

each of said rear bearing cooling fins is disposed so as to overlap with one of said diode cooling fins when said rear bracket is viewed in said axial direction of said shaft.

5. The alternator according to claim 2, wherein:

each of said rear bearing cooling fins is disposed between an adjacent pair of said diode cooling fins when said rear bracket is viewed in said axial direction of said shaft.

6. The alternator according to claim 5, wherein:

said rear bearing cooling fins extend between said adjacent pairs of said diode cooling fins in said axial direction of said shaft.

7. The alternator according to claim 1, wherein:

a value of (Sb/Sk) is within a range from 0.2 through 0.6, where Sb is a total surface area occupied by said rear bearing cooling fins in a plane of said suction inlet and Sk is an overall surface area of said suction inlet without said rear bearing cooling fins.

8. The alternator according to claim 1, wherein:

a plurality of suction inlets are provided, each of said suction inlets overlay at least a portion of said plurality of diode cooling fins in the axial direction of said shaft.

9. The alternator according to claim 8, wherein:

the plurality of suction inlets are disposed in a radial manner around said axial direction of said shaft, and said plurality of rear bearing cooling fins extend into said plurality of suction inlets.

10. The alternator according to claim 1, wherein:

said plurality of diode cooling fins extend further out in a radial direction from said shaft than said plurality of rear bearing cooling fins.

11. The alternator according to claim 1, wherein:

said plurality of diode cooling fins radially extend behind said suction inlet so as to cross said suction inlet when viewed from said axial direction.

12. The alternator according to claim 1, wherein:

said plurality of rear bearing cooling fins extend from said inner peripheral side of said suction inlet in an outward radial direction.

13. The alternator according to claim 1, wherein:

said plurality of rear bearing cooling fins respectively have a free end disposed in said suction inlet.

14. The alternator according to claim 1, wherein:

said plurality of diode cooling fins are visible through said suction inlet when viewed from said axial direction.

* * * * *